United States Patent [19]
Anthon et al.

[11] Patent Number: 5,651,022
[45] Date of Patent: Jul. 22, 1997

[54] MULTI-ELEMENT MONOLITHIC SOLID STATE LASER

[75] Inventors: Douglas W. Anthon, Wheaton; Timothy C. Munks, Crystal Lake, both of Ill.

[73] Assignee: ATX Telecom Systems, Inc., Naperville, Ill.

[21] Appl. No.: 577,424

[22] Filed: Dec. 22, 1995

[51] Int. Cl.$^6$ ........................................ H01S 3/08
[52] U.S. Cl. ........................ 372/92; 372/39; 372/98; 372/100; 372/106; 372/108
[58] Field of Search .................. 372/92, 98, 100, 372/106, 107, 108, 6, 39

[56] References Cited

U.S. PATENT DOCUMENTS

| | | |
|---|---|---|
| 3,582,820 | 6/1971 | Salzer et al. . |
| 3,895,313 | 7/1975 | Seitz . |
| 4,354,272 | 10/1982 | Schwob et al. . |
| 5,063,566 | 11/1991 | Dixon . |
| 5,182,759 | 1/1993 | Anthon et al. . |
| 5,321,718 | 6/1994 | Waarts et al. ............ 372/108 |
| 5,331,652 | 7/1994 | Rapoport et al. . |
| 5,363,391 | 11/1994 | Matthew et al. . |
| 5,381,427 | 1/1995 | Wedekind et al. . |
| 5,425,039 | 6/1995 | Hsu et al. .................. 372/6 |

OTHER PUBLICATIONS

Abramovici, "Minimal Nd: Yap Laser Configuration with Single Frequency Output," *Optics Communications*, vol. 61, No. 6, 401–404 (1987).

Anthon et al., "Diode–Pumped Erbium Glass Lasers," *SPIE*, vol. 1627 Solid State Lasers III pp. 8–12 (1992).

Aoki et al., "Stimulated Brillouin Scattering in a Long Single–Mode Fiber Excited with a Multimode Pump Laser," *J. Opt. Soc. Am. B*, vol. 5, No. 2, pp. 358–363 (1988).

Dixon et al., "523–nm Composite–Cavity Internally–Doubled Close–Coupled LNP Cube Laser," *Conference on Lasers and Electro–Optics*, Anaheim, California, May 21–25, 1990.

Gapontsev et al., "Effective 1.054–1.54 Stimulated Emission Conversion," *JETP Letters*, vol. 18, pp. 251–253 (1973).

Gapontsev et al., "Erbium Glass Lasers and Their Applications," *Optics and Laser Technology*, Aug. 1982, pp. 189–196.

Gimlett et al., "Effects of Phase–to–Intensity Noise Conversion by Multiple Reflections on Gigabit–per–Second DFB Laser Transmission Systems," *Journal of Lightwave Technology*, vol. 7, No. 6, pp. 88–895 (1989).

Hanna et al., "A 1.54 m Er Glass Laser Pumped By A 1.064 m Nd: Yag Laser," *Optics Communications*, vol. 63, No. 6, pp. 417–420 (1987).

Holtom et al., "Design of a Birefringent Filter for High–Power Dye Lasers," *Journal of Quantum Electronics*, vol. QE–10, No. 8, pp. 577–579 (1974).

Hutchinson, "Diode Array–Pumped Er, Yb: Phosphate Glass Laser," *Appl. Phys. Lett.*, vol. 60, No. 12, pp. 1424–1426 (1992).

Laporta et al., "10 kHz–Linewidth Diode–Pumped Er:Yb:Glass Laser," *Electronics Letters*, vol. 28, No. 22, pp. 2067–2069 (1992).

(List continued on next page.)

*Primary Examiner*—Leon Scott, Jr.
*Attorney, Agent, or Firm*—Leydig, Voit & Mayer, Ltd.

[57] ABSTRACT

A monolithic solid state laser structure is used to construct erbium lasers that are insensitive to external pressure changes and vibrations, and have improved cooling of the gain medium and reduced thermal lensing effect. In the monolithic laser structure, the gain medium is separated from an optically transmissive plate on one side and a wave plate on the other side by spacers to form narrow air gaps which provide effective cooling of the gain medium and reduced the thermal lensing effect. Such an arrangement is further combined with a pressure-insensitive Brewster polarizer, such as a solid Brewster polarizer or a pressure-sealed Brewster plate, to form a pressure-insensitive laser cavity. The wave plate cooperates with the Brewster polarizer to select the wavelength of the solid state laser.

35 Claims, 5 Drawing Sheets

OTHER PUBLICATIONS

Laporta et al., "Diode–Pumped CW Bulk Er:Yb:Glass Laser," *Optics Letters*, vol. 16, No. 24, pp. 1952–1954 (1991).

Nazarathy et al., "Progress in Externally Modulated AM CATV Transmission Systems," *Journal of Lightwave Technology*, vol. 11, No. 1, pp. 82–105 (1993).

Snitzer et al., "13M–3 Phosphate Glass $Er^{3+}$ Laser, E.," *IEEE Journal of Quantum Electronics*, pp. 360–361 (1968).

Snitzer et al., "$Yb^{3+}$–$Er^{3+}$Glass *Laser*," *Applied Physics Letters*, vol. 6, No. 3, pp. 45–46 (1965).

Wallmeroth, "Monolithic Integrated Nd:YAG laser," *Optics Letters*, vol. 15, No. 16, pp. 903–905 (1990).

Conference, entitled, "QE–7 Erbium Phosphate Laser Glass," Kigre, Inc., Hilton Head, S.C., pp. 14–15.

Printed Agenda and Abstract of Oral Presentation, Naval Postgraduate School, Session Four—Link Demonstrations, Jan. 19, 1995, entitlted "Advances in 1.3 and 1.55 m Diode Pumped Solid State Lasers for Wide Dynamic Range Links," by Timothy C. Munks, including Photocopies of Transparencies used with the Oral Presentation.

Monolithic, unidirectional single–mode Nd:YAG ring laser, Thomas J. Kane and Robert I. Byer, Feb. 1985, vol. No. 2, Optics Letters.

On the production and use of the optical contact bond, R.N. Smartt and J.V. Ransay, Division of Physics, National Standards Laboratory, Apr. 20, 1964.

Frequency stability and offset locking of a laser–diode–pumped Nd:YAG monolithic nonplanar ring oscillator, Thomas J. Kane, Alan C. Nilsson, and Robert L. Byer, Mar. 1987, vol. 12, No. 3, Optical Society of America.

MULTI-ELEMENT MONOLITHIC SOLID STATE LASER

FIELD OF THE INVENTION

The invention relates generally to lasers, and more particularly to lasers using solid state gain materials to generate laser waves.

BACKGROUND OF THE INVENTION

It has been known for more than 30 years that glasses doped with erbium ions can operate as lasers (see, e.g., E. Snitzer & R. F. Woodcock, "$Yb^{3+}$—$Er^{3+}$ Glass Laser," Appl. Phys. Lett. 6, 45 (1965)). Early work on erbium glass lasers used silicate glasses and incorporated ytterbium ions as a sensitizer that would absorb pump energy and transfer it to the erbium ions. Within a few years, however, it was shown that phosphate glass was a significantly better host material for this ytterbium sensitized erbium laser system (see, E. Snitzer, R. F. Woodcock & J. Segre, "Phosphate Glass $Er^{3+}$ Laser," IEEE J. Quantum Electronics 4, 360, (1968)). Subsequent work with other glasses and crystals demonstrated that, because of its phonon energies, phosphate glass is a uniquely efficient host material for this laser system (see, e.g., V. P. Gapontsev et al., "Erbium Glass Lasers and Their Applications," Opt. Laser Technol., 189 (1982)).

A laser using ytterbium-sensitized erbium-doped phosphate glass as the gain medium can be pumped with different types of pump sources. Ytterbium ions in phosphate glass have a broad absorption peak stretching from 800 nm to 1100 nm, with a peak at 975 nm. Well established pump sources include InGaAs laser diodes generating wavelengths between 940 nm and 990 nm, and neodymium lasers generating wavelengths between 1040 nm and 1080 nm. U.S. Pat. No. 3,582,820 to Snitzer discusses intracavity pumping of an erbium laser with neodymium lasers. End pumping with a neodymium laser has been discussed in detail by D. Hanna, et al., in Optics Commun. 63, 417 (1987). A compact intracavity pumped erbium laser has been described by D. W. Anthon & T. J. Pier, in "Diode Pumped Erbium Glass Lasers," Solid State Lasers III, Gregory J. Quarles, Editor, Proc. SPIE 1627, 8–12 (1992). Pumping with laser diodes in the 940 nm to 990 nm region has been used in a side-pumped configuration by J. A. Hutchinson & T. H. Allik, in "Diode Array Pumped Er,Yb: Phosphate Glass Laser," Appl. Phys. Lett. 60, 1424–6 (1992), and in an end pumped geometry by P. Laporta et al., in "Diode Pumped CW Bulk Er:Yb:Glass Laser," Optics. Lett. 16, 1952 (1991).

Recent interest in erbium glass lasers comes from the desire to produce a suitable laser source for externally modulated CATV transmission systems. In a CATV system, analog optical signals are transmitted through optical fibers over tens of kilometers. Nd:YAG lasers operating at the wavelength of 1318 nm have been shown to be acceptable as light sources for signal transmitters, and much of the experience with the CATV technology has been achieved using these devices. Nevertheless, it is highly desirable to provide a suitable laser source that operates at 1550 nm wavelength. This is because a typical fused silica optical fiber has the lowest attenuation around that wavelength. The low attenuation allows an optical signal at that wavelength to be transmitted over a longer distance. Because the gain of erbium-doped glass covers a range of wavelengths centered around 1550 nm, there is currently strong interest in developing suitable erbium glass lasers for transmitting CATV signals.

There are, however, numerous requirements for a laser source used in the CATV signal transmission system that make it difficult to find a suitable erbium laser for such an application. One difficulty is related to bandwidth and dispersion. For Nd:YAG lasers operating at 1318 nm, where the dispersion minimum of optical fibers lies, a relatively wide (up to 200 Ghz) bandwidth is acceptable. The dispersion at 1550 nm, however, is nearly ten times higher than that at 1318 nm. Even with the dispersion compensation techniques developed in the last few years, a narrower bandwidth would be required at 1550 nm. In most cases, it is more effective to start with a single-mode laser source, and then apply external phase modulation to the laser source to achieve the desired bandwidth.

Single-mode lasers, however, are sensitive to external perturbations, because small cavity length changes can cause the laser to shift to different longitudinal modes. Such mode hops often coincide with periods of two-mode operation that cause unacceptable dispersion effects.

Pressure sensitivity also contributes to the instability of single-mode lasers. The refractive index of air at room temperature is approximately $1+(\Delta n\ P)$, with $\Delta n \approx 0.00029$ $atm^{-1}$. Although this number appears to be small, the changes in the optical length of the cavity resulting from ambient pressure changes can cause severe mode hopping, which significantly degrades the performance of the laser.

Power is another important issue. At 1318 nm, it is possible to extract several hundred mW from a Nd:YAG laser. Even though the power requirement is usually somewhat lower due to the significantly lower losses at 1550 nm, an erbium laser for the CATV application is still required to operate at an output power level about 150 mW. Due to the rather poor thermal and mechanical properties of phosphate glass, operating an erbium laser at such a high power level can produce a significant amount of heat in the erbium glass and cause damages such as fracture or surface melting. Furthermore, heat in the gain medium can also cause severe thermal lensing that significantly degrades the quality and quantity of the laser output.

Besides meeting specific technical requirements such as power and signal/noise ratio, it is also imperative for an erbium laser developed for commercial applications, such as the CATV application, to be robustly constructed. A laser that provides adequate performance on an optical table may not be suitable for commercial uses. For example, the laser may not able to survive through the type of rough handling it is likely to experience during the installation of the optical transmission system. Similarly, the laser may not function properly in an uncontrolled environment characterized by vibrations, pressure changes, and temperature fluctuations. If the laser is not rigidly constructed, the alignment of its optical elements is likely to be lost either due to handling or due to external perturbations in the environment.

SUMMARY OF THE INVENTION

Accordingly, it is a general aim object of the invention to provide a solid state laser that is robust, insensitive to pressure changes and external vibrations, and provides improved output power without overheating the gain medium.

It is a more specific object of the invention to provide an erbium laser operating at a stable single frequency and insensitive to external vibrations and pressure changes.

It is a related object of the invention to provide an erbium laser that is capable of operating at high output power levels without damaging the gain medium.

It is another related object of the invention to provide an erbium laser that has minimal thermal lensing effects.

In accordance with these and other objects of the invention, a solid state laser includes a first optically transmissive plate disposed adjacent to and separated from a first surface of a gain element by a first air gap and a wave plate is disposed adjacent to and separated from a second surface of the gain medium by a second air gap. The air gaps between the transmissive plate, the gain medium and the wave plate not only allow effective heat transfer from the surfaces of the gain medium to the transmissive plate and the wave plate but also permit the gain medium to operate athermally. The small thickness of the air gaps also make this sandwich structure substantially insensitive to pressure changes. A pressure-insensitive Brewster polarizer, such as a solid polarizer, is disposed immediately adjacent to the wave plate to minimize the length of the air space between the Brewster polarizer and the wave plate for improved pressure insensitivity. The Brewster polarizer cooperates with the wave plate to select the laser wavelength. The laser has a laser cavity defined by an input mirror and an output coupler. The input mirror transmits a pump wave into the laser cavity. The gain medium absorbs the pump wave and generates the laser wave. The output coupler transmitting a portion of the laser wave generated by the gain medium out of the laser cavity.

Other objects and advantages will become apparent from the following detailed description when taken in conjunction with the drawings, in which:

DETAILED DESCRIPTION OF THE PREFERRED EMBODIMENT

Figure 1:
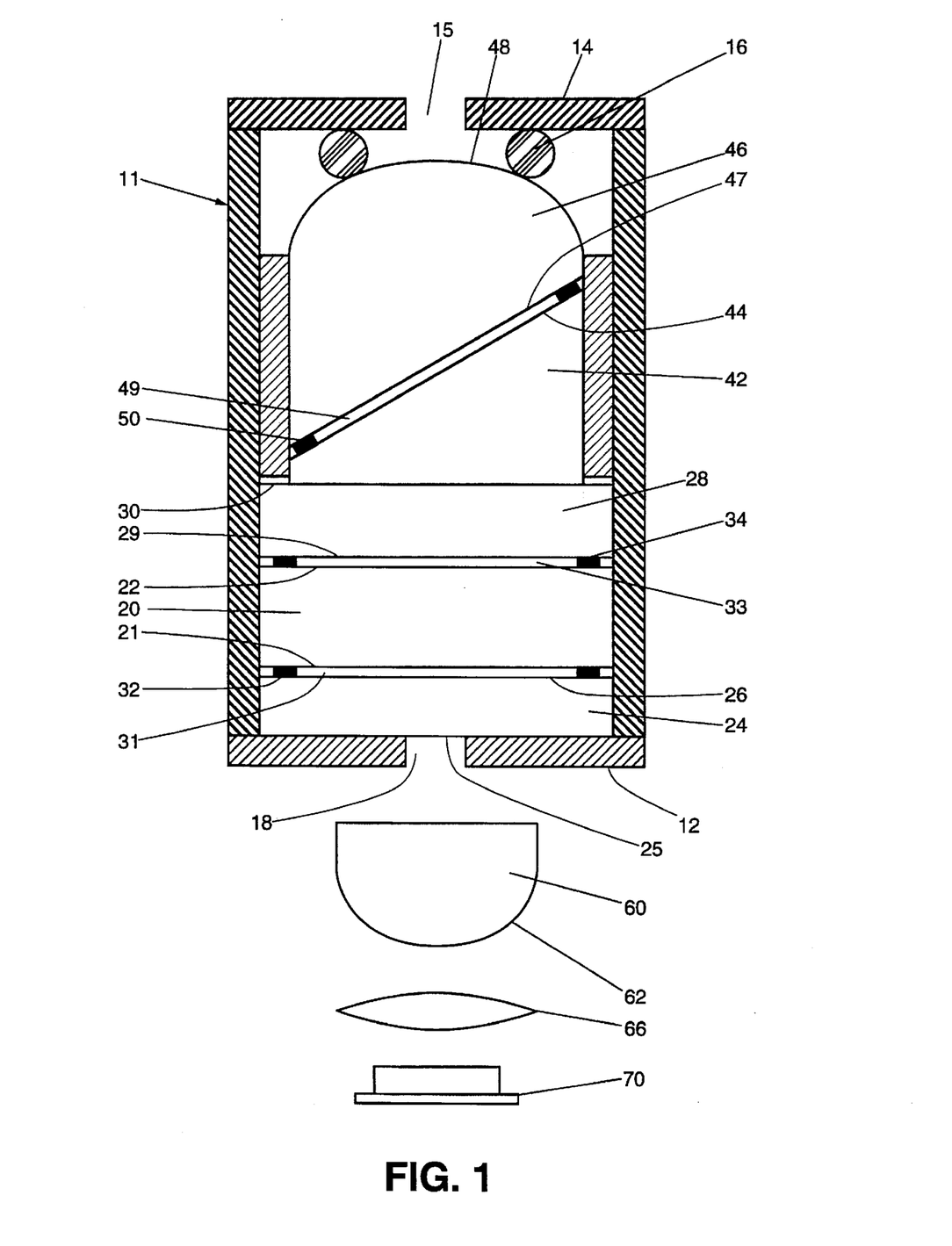
FIG. 1 is a schematic cross-sectional view of an erbium laser having a monolithic construction according to the teaching of the present invention.

Turning now to the drawings, FIG. 1 shows a preferred embodiment of an erbium laser having a laser structure according to the teaching of the present invention. The gain medium 20 in the laser in FIG. 1 is separated from an optically transmissive plate 24 and a wave plate 28 by air gaps 31 and 33, respectively. As will be described in greater detail below, such a sandwich structure not only provides effective surface cooling of the gain medium 20 but also minimizes the thermal lensing effect therein. Another significant advantage of such an arrangement is that the air portion of the optical path length of the sandwich structure is extremely short due to the small thickness of the air gaps 31 and 33. In the laser structure illustrated in FIG. 1, this advantage is utilized by combining the sandwich structure with a Brewster polarizer that is insensitive to pressure changes to form a laser cavity that is highly pressure insensitive. It will be appreciated by those skilled in the art that even though the solid state laser architecture according to the present invention will be illustrated using embodiments of erbium lasers, such laser architecture can be advantageously employed in lasers using other types of solid state gain materials.

In more detail, the gain medium 20 of the laser in FIG. 1 is a piece of ytterbium sensitized erbium-doped phosphate glass (hereafter referred to as erbium glass). The thickness of the gain medium 20 used in this embodiment is 1.5 millimeter. The two surfaces 21 and 22 of the gain medium 20 are parallel to each other and are both anti-reflection (AR) coated for both the pump wavelength of 1064 nm and the laser wavelength of 1550 nm. In the present embodiment, the gain material 20 is the QE-7 type erbium glass manufactured by Kigre, in Hilton Head, S.C. The QE-7 type erbium glass has an erbium ion concentration of approximately 0.5 percent by weight and an ytterbium concentration of approximately 12.0 percent by weight. Similar glasses are available from several suppliers.

The laser cavity of the erbium laser in FIG. 1 is defined by an input mirror 26, which is a surface of an optically transmissive plate 24, and an output coupler 48, which is a curved surface on a prism 46. The flat input mirror 26, which transmits the pump wave into the laser cavity, is coated to be less than 10 percent reflective at the pump wavelength of 1064 nm and highly reflective in the range between 1530 nm and 1570 nm. The other surface 25 of the plate 24 is anti-reflection (AR) coated for the pump wavelength of 1064 nm. The output coupler 48 transmits a portion of the circulating laser wave generated by the gain medium 20 out of the laser cavity. The reflectivity of the output coupler 48 is typically set at 97 percent, although values from 85 percent to 99.9 percent have been used. The radius of the output coupler 48 is chosen to give a mode radius between 50 µm and 80 µm in the gain medium 20.

In the embodiment in FIG. 1, the erbium laser is pumped by a neodymium laser using an intracavity pumping scheme. The neodymium laser uses a Nd:YAG rod 60 as the gain material to generate a pump wave at 1064 nm. The laser cavity of the neodymium laser is defined by a curved surface 62 on one end of the Nd:YAG rod 60 and a surface 29 of a wave plate 28. The curved surface 62 is coated to be highly reflective at 1064 nm and highly transmissive at 808 nm. The surface 29 of the wave plate 28 is coated to be highly reflective at 1064 nm and less than 10 percent reflective at the erbium laser wavelength. In this intracavity pumping arrangement, the laser cavity of the neodymium laser overlaps with the laser cavity of the erbium laser, and the gain medium 20 is disposed inside the laser cavity of the neodymium laser.

The neodymium laser is in turn pumped by a laser diode 70 which generates an output wave at 808 nm. The output from the laser diode 70 is focused by a spherical lens 66 into the Nd:YAG rod 60.

In order to operate the erbium glass laser at a relatively high output power level, the gain medium 20 of the laser has to be effectively cooled to prevent damages caused by the heat load therein. In the laser architecture illustrated in FIG. 1, effective cooling of the gain medium 20 is provided by positioning the gain medium 20 very close to two other optical elements which are significantly better thermal conductors than the gain medium 20. As shown in FIG. 1, the first surface 21 of the gain medium 20 is separated from the optically transmissive plate 24 by a small air gap 31, the second surface 22 of the gain medium 20 is separated from the wave plate 28 by a second small air gap 33. The two air gaps 31 and 33 are made sufficiently narrow to allow efficient heat transfer from the surfaces 21 and 22 of the gain medium 20 via air to the plate 24 and the wave plate 28. Because the plate 24 and the wave plate 28 are made of materials with significantly higher thermal conductivities than that of phosphate glass, they efficiently dissipate away the heat transferred from the surfaces 21 and 22 of the gain medium 20 across the air gaps 31 and 33. In this way, effective face cooling of the gain medium 20 is provided. In the preferred embodiment, the plate 24 and the wave plate 28 are both made of quartz crystal.

Maintaining a narrow air gap at each of the surfaces 21 and 22 of the gain medium 20 not only provides effective face cooling but also permits athermal operation of the erbium laser gain medium 20. The term "athermal" as used here indicates that the cavity mode frequency of the erbium laser has a very weak dependence on the temperature of the gain medium 20. Phosphate glass, the host material for the lasing erbium ions, has a refractive index that decreases with temperature. If a piece of uniformly heated erbium glass (i.e., erbium-doped phosphate glass) of length L with AR coating on both surfaces is placed in a resonator of length $L_1$ with an air gap provided at each of the erbium glass surfaces, the cavity mode frequency scans as:

$$df/dT = (fnL/L_1)((1/n)(dn/dT) + (1 - 1/n)\alpha), \quad (1)$$

where f is the cavity mode frequency, T is the temperature of the erbium glass, n is the index of refraction of the erbium glass, and $\alpha$ is the thermal expansion coefficient of the erbium glass. Calculation based on the manufacturer's data for the QE-7 erbium glass used in the embodiment of FIG. 1 gives $(1/n)(dn/dT) + (1 - 1/n)\alpha = -0.07$ ppm/K. In comparison, if the same erbium glass is coated on both surfaces to be highly reflective so as to form a cavity with $L = L_1$, the scan rate is:

$$df/dT = fn((1/n)(dn/dT) + \alpha), \quad (2)$$

and calculation gives $(1/n)(dn/dT) + \alpha = 7.3$ ppm/K. This comparison shows that by AR coating the surfaces of the erbium glass and keeping air gaps between the erbium glass and adjacent optical elements, the dependence of the cavity mode frequency on the temperature of the erbium glass is minimized. This is because in such a configuration the thermal expansion of the erbium glass is compensated by displacing air from the laser cavity. In this way, thermal lensing caused by thermal expansion of the erbium glass can be minimized. It will be appreciated by those skilled in the art that this configuration for athermal operation can also be used for other types of solid state gain media using host materials such as $YLiF_4$, $MgF_2$, $LiCaAlF_6$ and $Ca_5(PO_4)_3F$.

The adequate thickness of the air gaps 31 and 33 depends on the magnitude of thermal expansion of the gain medium 20. The air gaps 31 and 33 should be wide enough to accommodate the thermal expansion of the gain medium 20. On the other hand, if the gap width is too large, the effectiveness of face cooling of the gain medium 20 will be lost. Thermal conductivity of air at one atmosphere is only one thirtieth (1/30) of that of phosphate glass. It is therefore necessary to keep the width of the gaps 31 and 33 sufficiently small to allow efficient heat transfer from the gain medium 20 to the plate 24 and the wave plate 28. For the 1.5 mm thick gain medium 20 used in the present embodiment, a uniform heating to 350° C. gives athermal expansion of three (3) μm per side. This provides an upper limit of the thermal expansion of the non-uniformly pumped gain medium 20. Accordingly, the thickness of the air gaps 31 and 33 is set to be three (3) μm.

In the present embodiment, the air gaps 31 and 33 are formed by disposing spacers 32 and 34 between the gain medium 20 and the plate 24 and wave plate 28, respectively. Preferably the spacers 32 and 34 are formed by depositing dielectric material on either the gain medium 20 or the plate 24 and wave plate 28 to form a plurality of dielectric standoffs. The dielectric standoffs can be deposited using well known vacuum deposition techniques, such as ion sputtering deposition.

Because of the small thickness of the air gaps 31 and 33, the optical path length between the input mirror 26 of the plate 24 and the surface 30 of the wave plate 28 is insensitive to pressure changes. In accordance with the teaching of the present invention, a Brewster polarizer that is also pressure-insensitive is incorporated in the laser. The Brewster polarizer with the wave plate 28 form a normal incidence birefringent filter which selects the wavelength of the erbium laser and controls its bandwidth. Combining a pressure-insensitive Brewster polarizer with the sandwich structure comprising the gain medium 20, the plate 24 and the wave plate 28 provides a laser cavity that is insensitive to pressure changes.

The Brewster polarizer used in FIG. 1 is a solid Brewster polarizer which comprises two prisms 42 and 46. The two prisms 42 and 46 are made of the same material, preferably fused silica, so that they have the same index of refraction. The surface 44 of the prism 42 and the surface 47 of the prism 46 are parallel to each other and are separated by a small air gap 49 formed by inserting a spacer between the surfaces 42 and 44. The surfaces 44 and 47, which are uncoated, are positioned at a Brewster angle with respect to the optical path in the laser cavity. The thickness of the air gap 49 is set to be slightly less than a quarter of the laser wavelength of 1550 nm. With such an arrangement, the two prisms 42 and 46 function as a Brewster polarizer with a reflectivity comparable to a conventional Brewster plate. In the present embodiment, the air gap 49 is formed by separating the surfaces 44 and 47 with dielectric standoffs 50 which are deposited on either of the surfaces 44 and 47. The dielectric standoffs 50 have a thickness about 384 nm.

The solid Brewster polarizer and the wave plate 28 form a normal incidence birefringent filter. The wave plate 28 can be either a half-wave plate or a full-wave plate at the laser wavelength. In the present embodiment, the wave plate 28 is a piece of crystal quartz with its optical axes oriented perpendicular to the direction of the optical path in the laser cavity, and at an angle of 45 degrees from the plane of incidence of the Brewster polarizer formed by the prisms 42 and 46. The combination of the wave plate 28 and the Brewster polarizer provides a low-loss condition for any wavelength for which the wave plate 28 functions as a full-wave or half-wave plate, and such a wavelength will be selected as the laser wavelength. The wavelength selected in this way depends entirely on the thickness and temperature of the wave plate 28, and, due to the normal incidence configuration, is largely insensitive to small vibrations. Using well established fabrication techniques, it is possible to obtain full-wave or half-wave plates at any desired wavelength (see, J. M. Bennett, H. E. Bennett, Handbook of Optics, Chapter 10, "Polarization," W. G. Driscoll, Editor, McGraw Hill, 1978).

Because the air gap 49 between the prisms 42 and 46 is sufficiently small, the optical path length through the solid Brewster polarizer formed by the prisms 42 and 46 will not be significantly affected by air pressure changes. In accordance with the teaching of the present invention, this solid polarizer structure is advantageously combined with the sandwich structure comprising the plate 24, gain medium 20, and wave plate 28 to form a laser that is highly insensitive to external pressure changes. Preferably the Brewster polarizer formed by the prisms 42 and 46 is positioned immediately adjacent to the wave plate 28 so that any air gap that might exist between the wave plate 28 and the Brewster polarizer would be small. In the embodiment in FIG. 1, the prism 42 is disposed to abut the wave plate 28. With this arrangement, the total optical path length of the laser cavity contains less than seven (7) μm of air gaps. Calculation shows that even with a pressure change as large as 1 atm, the frequency shift for such a cavity with a cavity mode spacing of 10 GHz is only 50 MHz.

Besides the advantages such as pressure insensitivity, minimized thermal lensing, and efficient cooling of the gain medium, the laser in FIG. 1 has the further advantage of structural rigidity and robustness associated with its monolithic construction. Because the optical elements in the laser are either separated from each other by rigid dielectric standoffs or are in direct contact with each other, their relative positions are rigidly defined. As a result, the alignment of the optical elements of the laser is largely immune from external perturbations.

The robustness of the laser is further enhanced by enclosing the laser in a rigid housing 11. As shown in FIG. 1, the housing 11 has two ends 12 and 14. The end 12 has an aperture therein, through which the pump wave generated by Nd:YAG rod 60 enters the housing 11. The other end 14 has an aperture through which the output laser wave leaves the housing 11. Preferably the housing 11 is made of Invar for its low thermal expansion coefficient. In this preferred embodiment, the surface 25 of the plate 24 is disposed against the inner wall of the end 12 of the housing 11. An O-ring 16 is compressed between the output coupler 48 on the prism 46 and the inner wall of the end 14 of the housing 11. The optical elements of the laser are firmly held in their respective positions by means of the pressure exerted on the prism 46 by the compressed O-ring 16. It will be appreciated that this specific arrangement for holding the optical elements of the laser inside the housing 11 is only given as an example, and other ways for reliably holding the laser in the housing 11 may be employed without departing from the spirit and scope of the present invention.

The laser structure in FIG. 1 is also designed to allow stable single-mode operation of the erbium laser. The surface 29, which functions as a cavity mirror of the neodymium laser pump source, has a significant reflectivity at the erbium laser wavelength of 1550 nm. The surface 29, the input mirror 26, and the output coupler 48 form a three-mirror resonator. The surface 29 effectively divides the erbium laser cavity into two subcavities.

The mode spacing of the resonator is inversely proportional to optical distance between surfaces 26 and 48. To facilitate mode selection it is desirable to keep this distance as short as possible. Standing wave effects associated with the three mirror resonator cause further mode selection. The laser modes most likely to be excited in the laser cavity have a spacing that is inversely proportional to the optical length of the subcavity between surfaces 26 and 29. Keeping this length as short as possible maximizes the effective mode spacing of the resonator.

In the present embodiment, the input mirror 26 and the surface 29 are separated from the gain element 20 by air gaps 31 and 33, so that the optical length of the subcavity containing the gain medium 20 is nearly the same as the optical length of the gain medium 20. This maximizes the effective mode spacing in the resonator. The laser in FIG. 1 is capable of stable single-mode operation acceptable for the CATV application.

Figure 2:
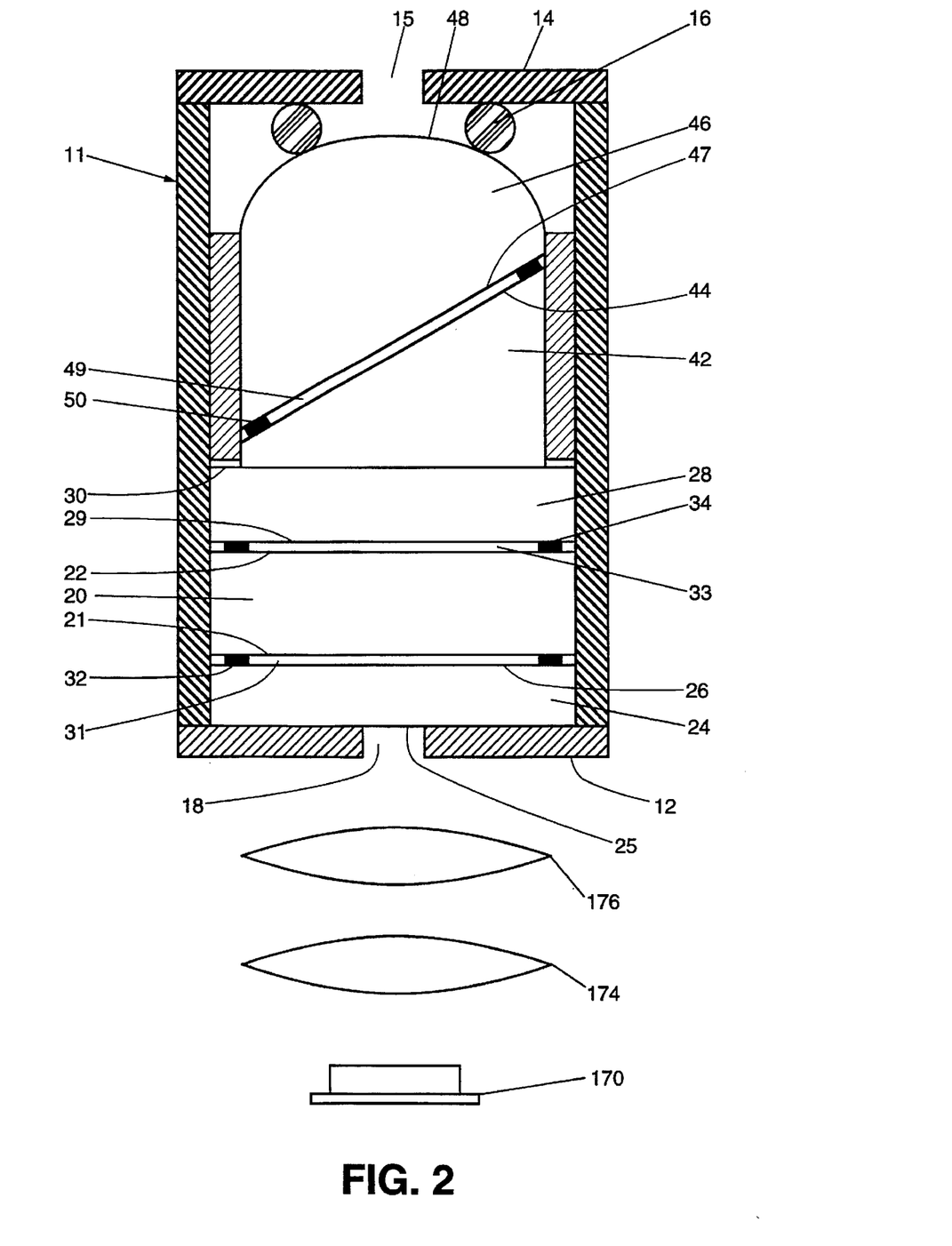
FIG. 2 is a schematic cross-sectional view of an erbium laser which is similar to the laser in FIG. 1 but is pumped by a laser diode.

Instead of using a neodymium laser as the pump source, an erbium laser constructed according to the teaching of the present invention can also be pumped directly by a laser diode. Such a pumping scheme is shown in FIG. 2. The laser diode 170 emits a pump wave with a wavelength between 940 nm and 990 nm. The pump wave from the laser diode 170 is focused into the erbium glass gain medium 20 with a combination of a spherical lens 174 and a cylindrical lens 176. A suitable laser diode for such an application is, for example, model SDL-6360-C from Spectral Diode Laboratories, 80 Rose Orchard Way, San Jose, Calif. 95134. When a laser diode 170 is used for pumping the erbium laser, the surface 26 is coated to be highly reflective in the region between 1530 nm and 1570 nm, and less than 10 percent reflective at the wavelength of the laser diode 170, and the surface 29 is coated to be highly reflective at the wavelength of the laser diode 170 and less than 10 percent reflective in the region between 1530 nm and 1570 nm.

Figure 3:
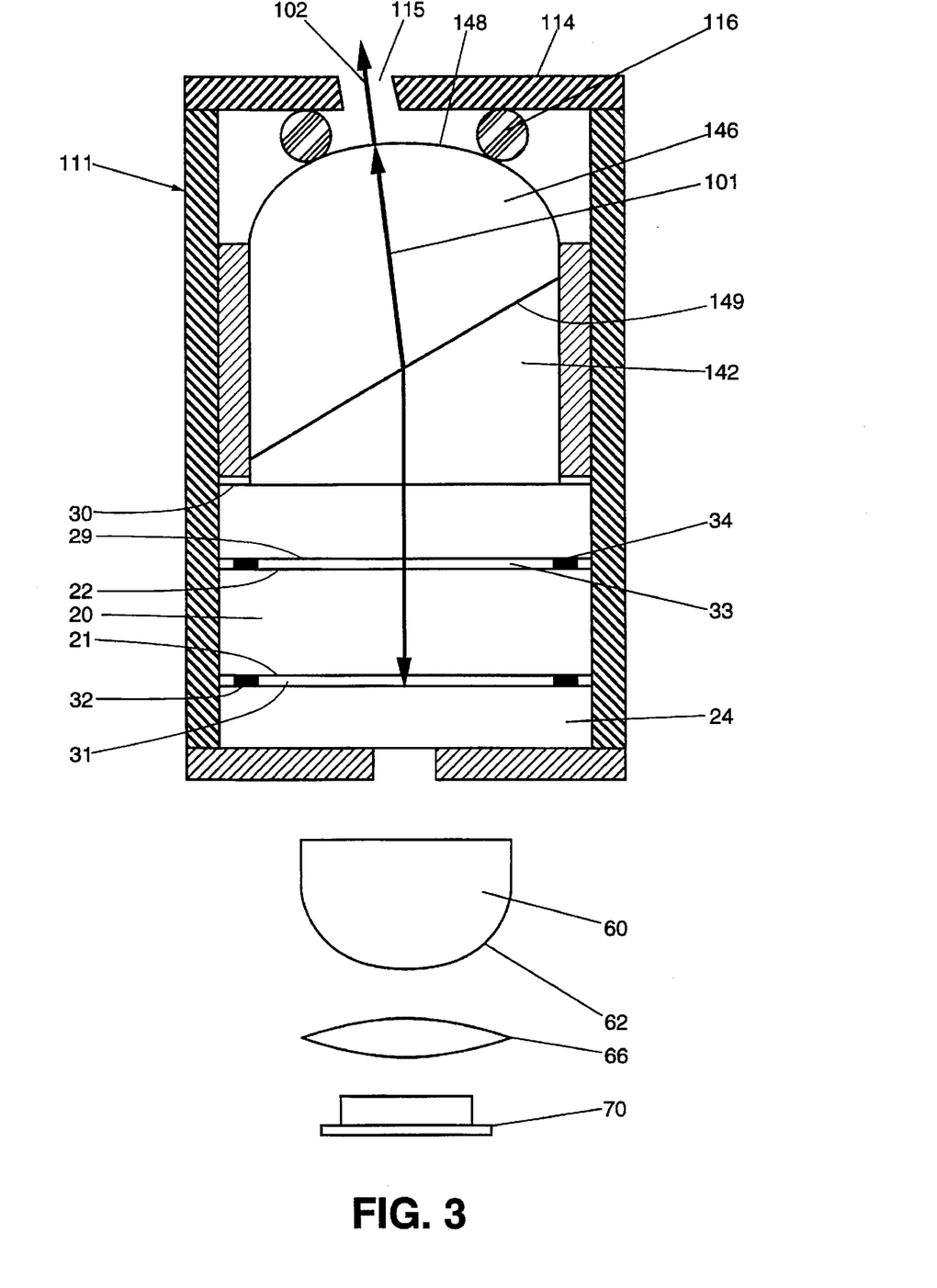
FIG. 3 is a schematic cross-sectional view of an erbium laser which has a solid polarizer comprising two prisms disposed in direct contact with each other to form a polarizing surface.

FIG. 3 shows another embodiment of an erbium laser which uses a solid Brewster polarizer of a design different from the solid Brewster polarizer shown in FIG. 1. In this embodiment, the solid Brewster polarizer comprises two prisms 142 and 146 which are in direct contact with each other to form a contact surface 149 disposed at a Brewster angle with respect to the laser wave from the gain medium 20. The polarizing effect is caused by the difference between the indices of refraction of the two prisms 142 and 146. In selecting suitable materials for making the prisms 142 and 146, it is important to consider the absorption losses of the materials at the laser frequency. Preferably the prism 146 is made of undoped YAG, and the prism 142 is made of fused silica. Undoped YAG has an index of refraction (n) of 1.81 at 1550 nm, and fused silica has an index of refraction (n) of 1.44 at 1550 nm. Both materials are selected for their low absorption at the 1550 nm laser wavelength. Using a solid Brewster polarizer comprising two prisms in direct contact has the advantage of further reducing the total length of air gaps in the laser cavity. On the other hand, due to the diffraction of light at the contact surface 149 between the prisms 142 and 146, the laser in FIG. 3 has a bent optical path 101 and a tilted output wave 102. The aperture 115 in the end plate 114 of the housing 111 is therefore offset from the center to accommodate the tilted output wave 102 of the laser.

Instead of using a solid Brewster polarizer, pressure insensitivity can also be achieved by using a Brewster plate that is pressure-sealed, i.e., the air space between the Brewster plate and its immediately adjacent optical elements is sealed from external atmosphere. Such a pressure-sealed polarizer is used in the embodiment shown in FIG. 4. In this embodiment, the polarizing element is a Brewster plate 249. The Brewster plate 249 and the wave plate 28 form a normal-incidence birefringent filter for controlling the wavelength and bandwidth of the erbium laser. The output coupler 248 is a concave surface of a plate 210, which preferably is made of fused silica. The output coupler 248 is coated to have a reflectivity at the laser wavelength typically around 97 percent. The Brewster plate 249 is mounted on a Brewster angle insert 280, which is a truncated cylinder having an aperture 282 through which the laser wave passes and an end surface 281 disposed at a Brewster angle with respected to optical path of the laser wave. The Brewster plate 249 is mounted on the end surface 281 by, for example, applying epoxy at the edge of the Brewster plate 249 where it contacts the end surface 281. The Brewster angle insert 280 is secured in a cylinder 290 by means of, for example, epoxy. In order to seal the air space between the wave plate 28 and the output coupler 248, the plate 210 and the wave plate 28 are disposed to abut the ends of the cylinder 290. The contact surface 294 between the plate 210 and the cylinder 290 and the contact surface 292 between the wave plate 28 and the cylinder 290 can be made air-tight by applying, for example, indium solder or epoxy at the contact surfaces 292 and 294. Because the air pressure in the pressure-sealed region is independent of the external pressure, the optical length in the pressure-sealed region is not affected by external pressure changes.

Figure 4:
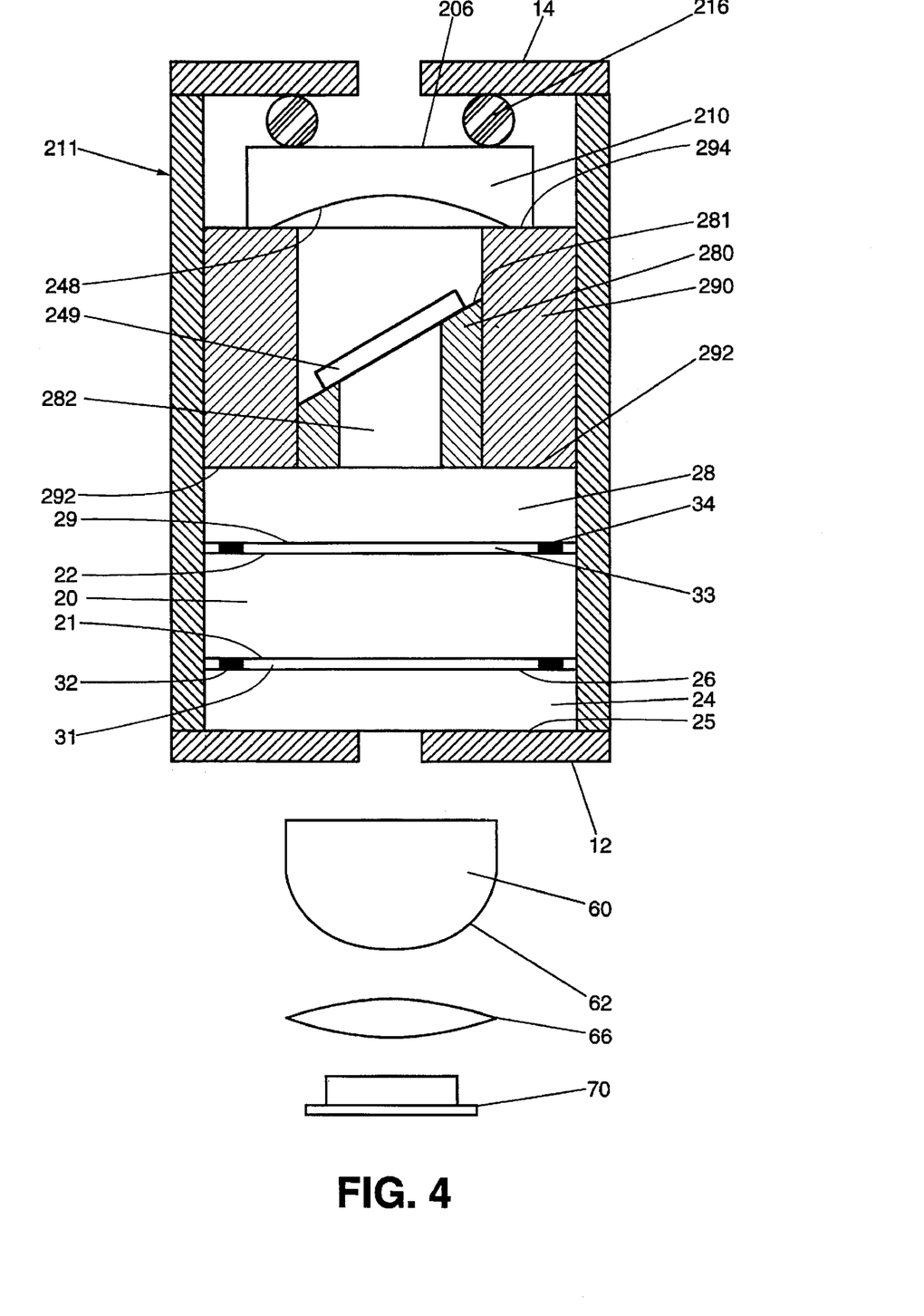
FIG. 4 is a schematic cross-sectional view of an erbium laser having a pressure-sealed Brewster polarizer.

The embodiment shown in FIG. 4 also has a monolithic structure and the structural rigidity and robustness associated with such a structure. Like the lasers shown in FIGS. 1 and 3, the optical elements of this embodiment are held in position inside the housing 211 by a compressed O-ring 216.

Figure 5:
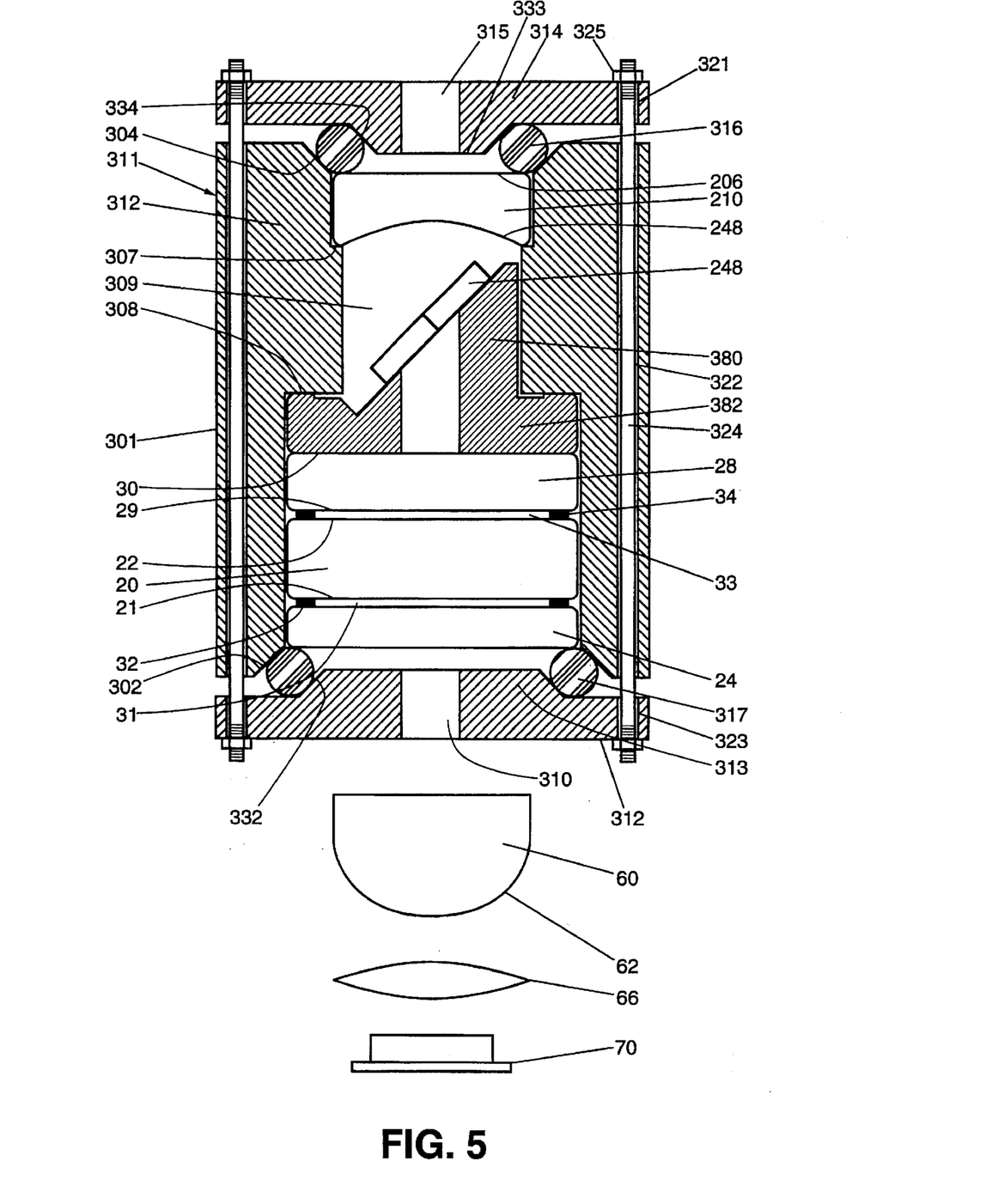
FIG. 5 is a schematic cross-sectional view of an erbium laser which has a pressure-sealed laser cavity.

FIG. 5 shows another embodiment of a monolithic erbium laser. The laser in FIG. 5 uses the same optical elements used in FIG. 4. However, instead of pressure-sealing only the Brewster plate 249, the whole laser cavity of the laser in FIG. 5 is pressure sealed in a single housing 311 from the external environment to achieve pressure insensitivity. The housing 311 of the laser comprises an upper disk 314, a lower disk 312, and a hollow cylindrical barrel 301, which are preferably made of Invar. The upper disk 314 has an aperture 315 for passing the output laser wave, and an annular raised portion 333 which forms a conical seating surface 334. A plurality of bolt holes 321 are disposed in the upper disk 314 near its circular periphery. The lower disk 312, similarly constructed, has an aperture 310 for passing the pump wave into the erbium laser, an annular raised portion 313 with a conical seating surface 332, and a plurality of bolt holes 323. The barrel 301 has a side wall 312 surrounding an aperture 309 and has two annular seating surfaces 307 and 308 disposed on its inner periphery transverse to its cylindrical axis. The barrel 301 also has a plurality of axially disposed bolt holes 322 through its side wall 312. A conical seating surface 304 is disposed on the inner periphery of the barrel 301 at the open end adjacent to the upper disk 314, and another conical seating surface 302 is disposed on the inner periphery of the barrel 301 at the open end adjacent to the lower disk 312.

The plate 210, on which the output coupler 248 is disposed, is seated inside the barrel 301 on the annular seating surface 307. The Brewster plate 249 is mounted on a Brewster angle insert 380 by means of, for example, application of epoxy. The Brewster angle insert 380 has a flange section 382 which is seated on the annular seating surface 308 and abuts the wave plate 28. An O-ring 316 is held between the top disk 314, the conical seating surface 304, and the plate 210. A second O-ring 317 is held at the input end of the laser between the plate 24, the conical seating surface 302, and the lower disk 312.

For purposes of illustration, the laser in FIG. 5 is shown in an uncompressed state and requires the final assembling step of compressing the parts together. To form a rigid structure, the upper disk 314 and the lower disk 312 are compressed firmly against the ends of the barrel 301. The bolt holes 321, 322, and 323 are aligned to allow long bolts 324 to extend all the way through the upper disk 314, the barrel 301, and the lower disk 312. Nuts 325 on the ends of the bolts 324 are tightened to securely attach the upper disk 314 and the lower disk 312 to the barrel 301. The O-ring 316, being compressed between the conical seating surfaces 334 and 304 and the surface 206 of the plate 210, forms an air-tight seal at the output end of the laser. Similarly, the O-ring 317 is compressed between the conical seating surfaces 302 and 332 and the plate 24 to form another air-tight seal at the input end of the laser. In this way, the entire laser cavity is pressure-sealed from the outside environment and is thus insensitive to external pressure changes. The compressed O-rings 316 and 317 further provide the compressional forces to firmly hold the optical elements of the laser in their respective positions.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly entitled.

What is claimed is:

1. A solid state laser for generating a laser wave of a predetermined laser wavelength, the laser comprising; a solid state gain medium absorbing a pump wave from a pump source and generating the laser wave, the gain medium having first and second surfaces which are flat and disposed generally parallel to each other; an optically transmissive plate adjacent to the first surface of the gain element, but separated from it to form a first air gap; an input mirror for transmitting the pump wave into the solid state gain medium; a wave plate adjacent to the second surface of the gain medium, but separated from it to form a second air gap; a solid Brewster polarizer adjacent to and cooperating with the wave plate to select the laser wavelength; and an output coupler disposed on the solid Brewster polarizer to (1) form with the input mirror a laser cavity having an optical path and (2) transmit a portion of the laser wave generated by the gain medium out of the laser cavity, the first and second surfaces of the gain medium having optical coatings which cooperate with the first and second air gaps to provide substantially athermal operation of the gain medium, the wave plate being disposed substantially normal to the optical path, thereby providing substantial vibration immunity.

2. The solid state laser of claim 1, where the solid state gain medium is ytterbium sensitized erbium-doped phosphate glass.

3. The solid state laser of claim 1, where the pump source includes a laser diode.

4. The solid state laser of claim 1, where the pump source includes a laser having a solid state gain medium.

5. The solid state laser of claim 4, where the gain medium is neodymium pumped by a laser diode.

6. The solid state laser of claim 1, where the wave plate is highly reflective for the wavelength of the pump wave and partially reflective at the wavelength of the laser wave.

7. The solid state laser of claim 1, where the wave plate is a half-wave plate at the wavelength of the laser wave.

8. The solid state laser of claim 1, where the wave plate is a full-wave plate at the wavelength of the laser wave.

9. The solid state laser of claim 1, where the wave plate is a quartz crystal.

10. The solid state laser of claim 1, where the solid Brewster polarizer abuts the wave plate.

11. The solid state laser of claim 10, where the output coupler is a surface of one of the two prisms of the solid Brewster polarizer.

12. The solid state laser of claim 1, where the solid Brewster polarizer includes two prisms having different indices of refraction at the wavelength of the laser wave and contacting each other to form a contact surface that polarizes the laser wave.

13. The solid state laser of claim 1, where the solid Brewster polarizer includes two prisms having identical indices of refraction separated by a third air gap.

14. The solid state laser of claim 13, where the third air gap is formed by a spacer inserted between the two prisms, the spacer having a thickness on the order of one quarter of the wavelength of the laser wave.

15. The solid state laser of claim 13, where the output coupler is a surface of one of the prisms of the solid Brewster polarizer.

16. The solid state laser of claim 1, where the first air gap is formed by a first spacer between the first surface of the gain medium and the optically transmissive plate, and the second air gap is formed by disposing a second spacer between the second surface of the gain medium and the wave plate.

17. The solid state laser of claim 16, where each of the first and second spacers includes at least one dielectric standoff.

18. A solid state laser for generating a laser wave of a predetermined laser wavelength, the solid state laser comprising: a solid state gain medium for absorbing a pump wave and generating the laser wave and having first and second surfaces which are flat and disposed generally parallel to each other; a laser cavity comprising an input mirror and an output coupler and an optical path, the input mirror transmitting the pump wave to the gain medium and the output coupler transmitting out of the laser cavity a portion of the laser wave generated by the gain medium; an optically transmissive plate adjacent the first surface of the gain element, but separated from it by a first air gap; a wave plate adjacent the second surface of the gain medium, but separated from it by a second air gap; a Brewster plate disposed in a space between the wave plate and the output coupler; the first and second surfaces of the gain medium having optical coatings which cooperate with the first and second air gaps to provide substantially athermal operation of the gain medium, the wave plate being disposed substantially normal to the optical path, thereby providing substantial vibration immunity.

19. The solid state laser of claim 18, where the solid state gain medium is ytterbium sensitized erbium doped phosphate glass.

20. The solid state laser system of claim 18, where the pump source includes a laser having a solid state gain medium.

21. The solid state laser of claim 20, where the pump source includes a neodymium laser.

22. The solid state laser of claim 18, where the pump source is a laser diode.

23. The solid state laser of claim 18, where the wave plate is highly reflective at the wavelength of the pump wave and partially reflective at the wavelength of the laser wave.

24. The solid state laser of claim 18, where the wave plate is a half-wave plate at the wavelength of the laser wave.

25. The solid state laser of claim 18, where the wave plate is a full-wave plate at the wavelength of the laser wave.

26. The solid state laser of claim 18, where the wave plate is quartz crystal.

27. The solid state laser of claim 18, where the first air gap is formed by a first spacer between the first surface of the gain medium and the optically transmissive plate, and the second spacer is formed by a second spacer between the second surface of the gain medium and the wave plate.

28. The solid state laser of claim 27, where each of the first and second spacers includes at least one dielectric standoff.

29. The solid state laser of claim 25, wherein the Brewster polarizer comprises two prisms of the same index of refraction separated by a third spacer to form a third air gap.

30. The solid state laser of claim 25, wherein the Brewster polarizer includes two prisms of different indices of refraction forming a contact surface that polarizes the laser wave.

31. A solid state laser receiving a pump wave and generating a laser wave at a laser wavelength, the solid state laser comprising: input and output mirrors defining a laser cavity and an optical path; an optically transmissive plate; a solid state gain medium having first and second surfaces which are generally parallel to each other, the first surface being separated from the optically transmissive plate by a first air gap formed by a first spacer; a wave plate adjacent to the second surface of the gain medium, but separated from it by a second air gap formed by a second spacer; a Brewster polarizer cooperating with the wave plate to select the laser wavelength; and a unitary housing for mounting the input and output mirrors, the optically transmissive plate, the solid state gain medium, the wave plate and the Brewster polarizer, the first and second surfaces of the gain medium having optical coatings which cooperate with the first and second air gaps to provide substantially athermal operation of the gain medium, the wave plate being disposed substantially normal to the optical path, thereby providing substantial vibration immunity.

32. The solid state laser of claim 31, where the gain medium is erbium-doped phosphate glass.

33. The solid state laser of claim 31, where the input mirror is disposed on the optically transmissive plate, and the wave plate is partially reflective at the laser wavelength.

34. The solid state laser of claim 33, including means for pressure sealing the laser cavity.

35. The solid state laser of claim 31, where each of the first and second spacers comprises at least one dielectric standoff.

* * * * *